United States Patent [19]

Budzich et al.

[11] 4,280,901

[45] Jul. 28, 1981

[54] METHOD AND APPARATUS FOR SEPARATING FINELY SIZED MATERIALS

[75] Inventors: Mieczyslaw Budzich; Forest G. Fitz, Jr., both of Lexington; Andrew M. Lawrence, Richland, all of S.C.

[73] Assignee: Nassau Recycle Corporation, Staten Island, N.Y.

[21] Appl. No.: 55,873

[22] Filed: Jul. 6, 1979

[51] Int. Cl.³ .............................................. B07B 4/04
[52] U.S. Cl. ................................... 209/154; 209/33; 209/135
[58] Field of Search ............... 209/32, 33, 133–137, 209/154

[56] References Cited

U.S. PATENT DOCUMENTS

| | | | |
|---|---|---|---|
| 213,070 | 3/1879 | Rhodes | 209/32 |
| 1,530,277 | 3/1925 | Mettler, Sr. | 209/137 |
| 2,212,305 | 8/1940 | Schneible | 209/133 |
| 2,973,862 | 3/1961 | Yak | 209/136 |
| 3,074,653 | 1/1963 | Schorsch | 241/14 |
| 3,109,807 | 11/1963 | Sauermann | 209/136 |
| 3,582,004 | 6/1971 | Lenz et al. | 241/19 |
| 3,749,322 | 7/1973 | Reynolds | 209/3 X |
| 3,823,820 | 7/1974 | Sosson | 209/44 |
| 3,941,684 | 3/1976 | Bradbury et al. | 209/3 |

FOREIGN PATENT DOCUMENTS 1222840 6/1960 France ................................... 209/134

Primary Examiner—William A. Cuchlinski, Jr.
Attorney, Agent, or Firm—Robert B. Kennedy

[57] ABSTRACT

A method and apparatus is disclosed for separating finely sized materials of diverse weights comprising a housing 8 having an opening 20 through which materials may be introduced for separation, an air intake 26 through which air may be introduced, and an air outlet 34 through which an air stream may exit. Means 53 are provided for forcing air into the housing 8 through the air intake 26 and out of said housing through the air outlet 34. A series of steps 10, 12, 14 is mounted within the housing 8 over which the materials may cascade. Means are further provided for channeling air introduced into the housing 8 through the air intake 26 into at least one air stream which passes between adjacent steps of the series of steps whereby the air stream may pass through the cascading materials and entrain the lighter materials.

5 Claims, 3 Drawing Figures

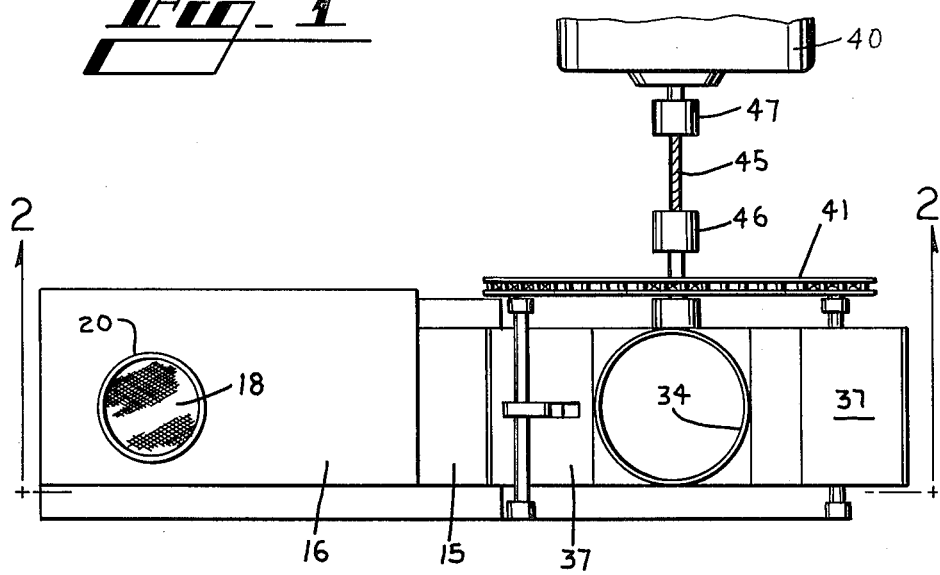
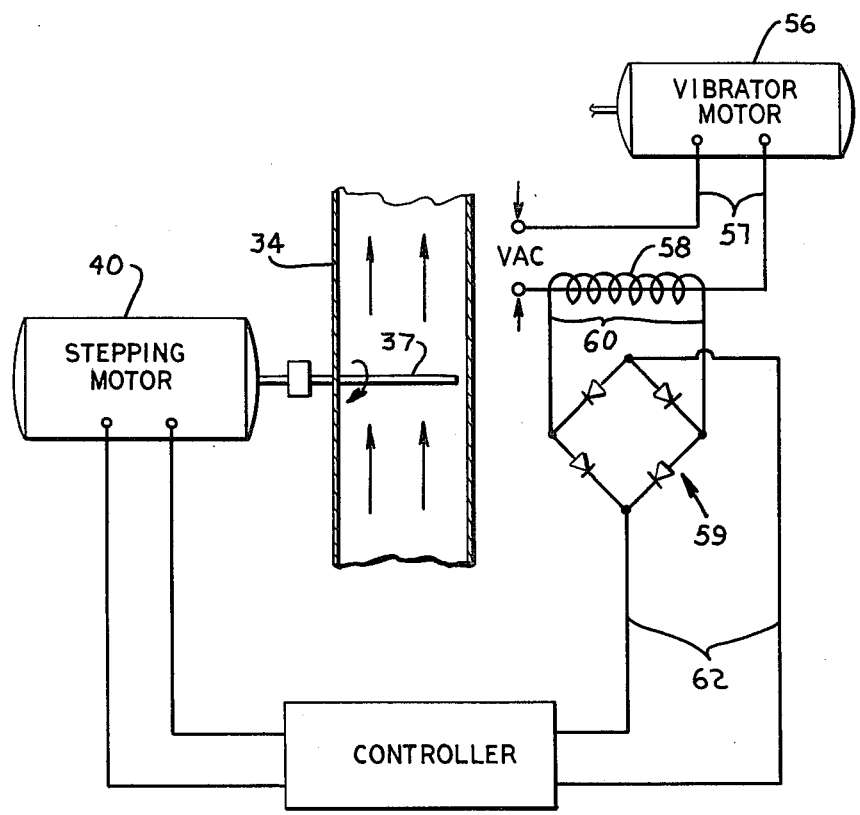

METHOD AND APPARATUS FOR SEPARATING FINELY SIZED MATERIALS

TECHNICAL FIELD

This invention relates to methods and apparatuses for separating finely sized materials of diverse weights.

BACKGROUND OF THE INVENTION

There are many industrial processes which require the separation of materials of diverse weights. One such process involves the separation of the composite materials of scrap insulated wire for recycling. In the telecommunications industry this wire is usually composed of an elongated, non-ferrous, conductive metal such as copper or aluminum covered with a layer of plastic or fibrous insulation. Where these wires are to be recycled they are typically passed through a granulator which cuts them into pieces. The cut pieces are then fed to a separator which separates the metallic from the nonmetallic components. The recovered metal may then be recast and drawn into new wire.

Separators used in the just described process often include one or more gravity tables such as those shown in the systems disclosed in U.S. Pat. Nos. 3,074,653 and 3,823,820. Other separators employ impact mills as exemplified by U.S. Pat. No. 3,749,322, or hammer mills in conjunction with sink separation means as shown in U.S. Pat. No. 3,582,004. Some other separators include fiber-dust separation means in conjunction with granulators as shown in U.S. Pat. No. 3,941,684. Still another type separator has been used in separating carbon particulates of relatively light weight, porous structures, as well as those of relatively flat configuration, from particulates of heavier or more rounded shape. With this latter type the material is poured into a hopper while blowing air through the streaming material thereby causing the lighter and flatter carbon particulates to be blown into an adjacent hopper.

The just described separators can be effective in separating the metallic components of the scrap wire from the non-metallic except for the materials of very small sizes such as those measuring less than some 25 mils which are often termed "superfines". The prior art separators have been largely ineffective in separating these. Thus, it is a common practice today to make no attempt at separating the components of superfines but rather to discard them as waste.

Separation of superfines is difficult because of the tendency of their metallic and non-metallic components both to become readily airborne. For example, where gravity tables are used air forced upwardly through the tables causes the metallic and non-metallic components of superfines to become an airborne mixture. This same adverse effect also occurs where air is blown across the top of a materials supporting table and through a screen. The use of screens or sieves themselves is also impractical because of their tendency to become clogged when superfine materials are passed therethrough due to the required smallness of the screen interstices.

In addition to the foregoing problems in separating superfines are those associated with changing conditions in the separation process itself. One of these is the varying materials input rates which a superfine separator must often handle. This may be caused by any one of several factors including changes in line speed and changes in recirculation rates of the coarse and fine materials as back to gravity tables or choppers for conventional separation or rechopping. The character of the input product itself may also vary from time to time such as where different types or sizes of wires or cables are introduced which produce different proportions of coarse, fine and superfine materials. These dynamic conditions seriously complicate attempts to solve the previously described problems presented in separating superfines. The present invention therefore is directed at overcoming these problems by providing methods and apparatuses which are workable and effective in separating finely sized materials of diverse weights such as superfines.

SUMMARY OF THE INVENTION

In one form of the invention apparatus is provided for separating finely sized materials of diverse weights which comprises a housing having an opening through which materials may be introduced for separation, an air intake through which air may be introduced, and an air outlet through which an air stream may exit. Means are provided for forcing air into the housing through the air intake and out of the housing through the air outlet. A series of steps is mounted within the housing over which the materials may cascade. Means are further provided for channeling air introduced into the housing through the air intake into an air stream which passes between adjacent steps of the series of steps whereby the air stream may pass through the cascading materials and entrain the lighter materials.

In another preferred form of the invention a method is provided for separating materials of diverse weights wherein the materials are gravitated over a series of steps as a cascade while streams of air are flowed through the cascade whereupon lighter materials are drawn from the cascade and entrained in the air streams.

BRIEF DESCRIPTION OF THE DRAWING

FIG. 1 is a plan view of apparatus for separating materials in accordance with the present invention which may be employed in practicing methods of the invention.

FIG. 3 is a schematic diagram of a control system employed by the apparatus shown in FIGS. 1 and 2.

DETAILED DESCRIPTION

Figure 2:
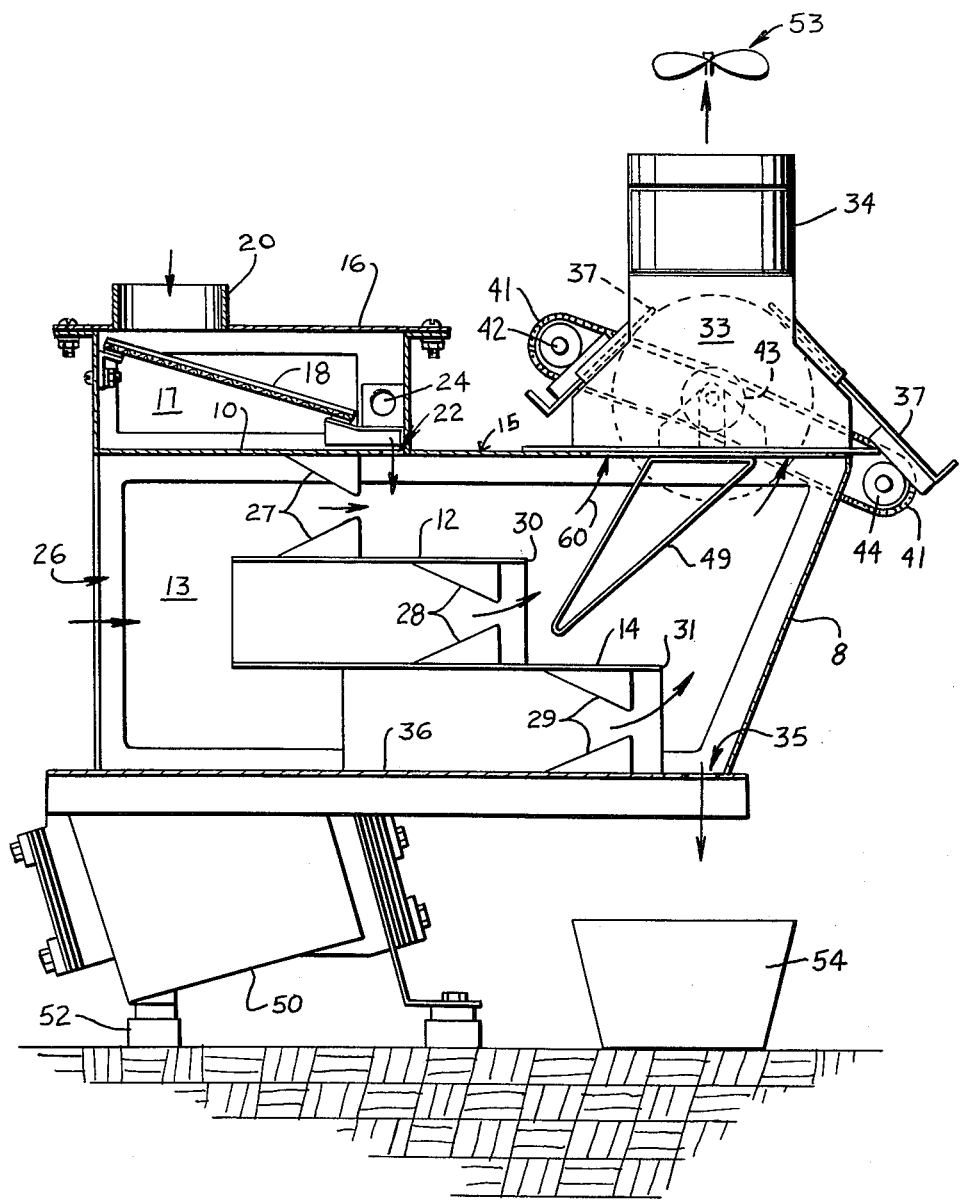
FIG. 2 is a side view, in cross-section taken along plane 2—2, of the apparatus illustrated in FIG. 1.

Referring now in more detail to the drawing, there is shown apparatus for separating superfine materials of diversed weights which comprises a housing 8 in which a series of vertically spaced steps or platforms 10, 12 and 14 are located with the uppermost step 10 being coplanar and coextensive with a housing top section 15. This top covers a lower chamber 13 in which steps 12 and 14 are located while another housing top section 16 covers an upper chamber 17 in which an inclined screen 18 is mounted over step 10. A materials intake chute 20 extends upwardly from about an opening in top 16 above an upper end of the inclined screen 18. A slot 22 is formed in the step 10 adjacent the lower end of screen 18. An aspiration opening 24 is provided in a side wall of the housing adjacent the lower portion of screen 18 from which dust may exit the upper chamber.

One side of the lower chamber is provided with a relatively large air intake opening 26 through which air may be drawn into the housing. Pairs of inlet weirs 27, 28 and 29 are mounted within the housing between the steps to provide nozzles. The nozzle formed by weirs 27 is seen to be located adjacent slot 22 while the nozzle provided by weirs 28 is located beneath the edge 30 of step 12 distal opening 26. The nozzle provided by weirs 29 is located beneath the edge 31 of step 14. A slot 35 is formed in the lower chamber floor 36 through which heavier materials may exit the housing.

The apparatus is further seen to include an exit chamber 33 having a flue 34 through which lighter materials may exit the housing. Within the exit chamber 33 is mounted a pair of movable shutters 37 which control the size of the entrance of the flue 34 as an air value. These shutters are coupled with a positioning motor such as stepping motor 40 by means of an endless chain 41 routed over and in mesh with sprockets 42, 43, and 44. The sprocket 43 is joined to a screw 45 by a coupling 46 which screw in turn is connected with the drive shaft of motor 40 by another coupling 47. The bottom of the exit chamber is open to either side of the top of a flow divider 49 mounted within the lower chamber. The entire housing is mounted atop a conventional vibrator 50 and coupled with a load cell 52 of a conventional strain gauge type structure. A bin 54 is positioned beneath slot 35 to collect the heavier materials separated by the apparatus.

With reference next to FIG. 3, a system for controlling the positions of the shutters 37 is illustrated in diagrammatical form. Here it is seen that the motor 56 which drives the vibrator 50 is coupled across a source of alternating electrical current by means of power leads 57. The current drawn through these leads is sensed by a coil 58 placed about one lead. The coil is connected across a full wave rectifier 59 by coil leads 60. The ouput of the rectifier is coupled by leads 62 with a controller operatively associated with the stepping motor 40. The controller may be a Century triac output type with a type 10210 Valve Drive sold by the Leads & Northropp Co. of North Whales, Pennsylvania. Other controllers may, of course, be used to provide incremental signals to the stepping motor in response to the achievement of incremental levels of sensed current drawn by the vibrator 56. Alternatively, the load cell 52 may be coupled with the Controller instead of the coil and rectifier circuitry. The stepping motor itself operates the shutters as shown in FIG. 3.

For operation, vibrator 50 is energized as are means for drawing air into air intake 26 such as a fan 53 located downstream of flue 34. A superfine material is then introduced into the separator through the chute 20 as by gravity and onto screen 18 within the upper chamber 17. Here any lightweight clusters or balls of substantially only fibrous material pass down atop the screen 18 and are drawn out through the aspiration opening 24 along with any dust as by the actions of the fan 53 in conjunction with unshown exterior ducts. The particulate materials however, along with fibrous balls in which copper is embedded, passes through and are broken up by the screen as they fall onto the step 10 and then to the slot 22 under the influence of the vibrations imparted to the housing by vibrator 50. From here the composite materials fall as a sheet onto step 12 and in doing so pass in front of the nozzle formed by weirs 27. The air stream passing between steps 10 and 12 achieves a high velocity as it passes through this nozzle causing the lighter material descending in sheet form just beyond the nozzle to become airborne and entrained in the air stream which then flows over flow divider 49 and upwardly into the exit chamber as indicated by arrow 60. The momentum of heavier material however causes them to fall upon step 12 before becoming so entrained. Once upon step 12 they migrate to edge 30 under the force of the housing vibrations from which they again fall as a sheet in front of the nozzle formed by weirs 28. Once again the lighter materials become airborne and entrained in the air stream passing between steps 12 and 14 while the heavier particles fall upon step 14. Here the process is again repeated with the materials migrating to and then over step edge 31 and falling to the bottom and out of the housing through slot 35 into collection bin 54. Once again as the material falls in front of the nozzle formed by weirs 29 the same effect occurs wherein the airstream passing through the falling materials entrains the lighter weight particles flowing them upwardly into the exit chamber 38. The lighter materials drawn into the exit chamber 33 finally pass through shutters 37 and out of the separator 34 through flue 34.

During the just described operation the rate of material being inputted into the separator may fluctuate from time to time. Were it not for the presence of movable shutters 37 such variations could substantially effect the separation operations. For example, during high input rates the apparatus could become so full of materials that a significant quantity of the lighter materials would not become entrained in the forced air streams. As it is however the load transducer or the vibrator motor current sensor recognizes changes in such rate as noted by an increase in the weight of the materials in the housing at any one time. For example, an increase in weight will cause the load on motor 56 to increase thereby causing it to draw more electric current. This increase in current is sensed by increased current induced into inductor 58. In turn a higher level of D.C. current is present to the controller which causes the stepping motor to make incremental step-like motions of its output shaft thereby forcing the shutters to open somewhat. Conversely, should the input of material be slowed less material becomes located within the apparatus at any particular time and the vibrator motor will draw less current in performing less work which again is sensed causing the stepping motor to close the shutters. Again, the load transducer may be used in lieu of the motor current sensor circuitry. In this matter the apparatus may self adjust its operations to accommodate changing conditions and continuously achieve separation purity rates well in excess of 99%.

It should be understood that the just described embodiments merely illustrate principles of the invention in selected forms. Many modifications, additions and deletions may, of course, be made thereto without departure from the spirit and scope of the invention as set forth in the following claims.

What is claimed is:

1. Apparatus for separating finely sized materials of diverse weights comprising a housing having an opening through which materials may be introduced for separation, an air intake through which air may be introduced, and an air outlet through which an air stream may exit; means for forcing air into said housing through said air intake and out of said housing through said air outlet; a series of steps mounted within said housing over which the materials may cascade; means for channeling air introduced into said housing through said air intake into at least one air stream which passes between adjacent steps of said series of steps whereby the air stream may pass through the cascading materials and entrain the lighter materials; valve means for controlling the flow of the air stream out of the housing through said air outlet; means for sensing the aggregate weight of the materials in said housing at any one time; and means for controlling said valve means in response to the materials weight sensed by said sensing means.

2. Apparatus for separating materials in accordance with claim 1 further comprising means for vibrating said steps including an electric motor, and wherein said materials weight sensing means includes means for sensing the electrical current drawn by said electric motor.

3. Apparatus for separating materials in accordance with claim 1 wherein said materials weight sensing means includes a load transducer.

4. A method of separating finely sized materials of diverse weights wherein the materials are gravitated over a series of steps as a cascade while streams of air are flowed transversely through the cascade whereupon lighter materials are drawn from the cascade and entrained in the air streams; wherein the weight of the materials during separation is sensed; and wherein the rate of flow of the air streams is controlled in response to the sensed materials weight.

5. A method of separating materials in accordance with claim 4 wherein the steps are vibrated as the materials are gravitated thereover.

* * * * *